(12) United States Patent
Jobe (10) Patent No.: US 11,807,440 B2
(45) Date of Patent: *Nov. 7, 2023

(54) COMPOSTABLE OR RECYCLABLE PACKAGING WRAP

(71) Applicant: Vericool World LLC, San Ramon, CA (US)

(72) Inventor: Darrell Jobe, Livermore, CA (US)

(73) Assignee: Vericool World LLC, San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,331

(22) Filed: Feb. 14, 2022

(65) Prior Publication Data

US 2022/0219877 A1 Jul. 14, 2022

Related U.S. Application Data (63) Continuation of application No. 16/519,730, filed on Jul. 23, 2019, now Pat. No. 11,247,827.

(Continued)

(51) Int. Cl.
*B65D 81/03* (2006.01)
*B65D 65/10* (2006.01)
(Continued)

(52) U.S. Cl.
CPC ............ *B65D 81/03* (2013.01); *B65D 65/10* (2013.01); *B65D 65/22* (2013.01); *B65D 65/46* (2013.01)

(58) Field of Classification Search
CPC .......... B32B 2307/7163; B32B 27/306; B32B 2255/24; Y02W 90/10; B65D 65/40;
(Continued)

(56) References Cited

U.S. PATENT DOCUMENTS 3,304,219 A 2/1967 Nickerson
3,683,760 A 8/1972 Silva
(Continued)

FOREIGN PATENT DOCUMENTS

CN 107955242 4/2018
CN 207404224 5/2018
(Continued)

OTHER PUBLICATIONS

Extended European Search Report in European Application No. 19840261.2, dated Mar. 14, 2022, 7 pages.
(Continued)

*Primary Examiner* — Christopher R Demeree
(74) *Attorney, Agent, or Firm* — Fish & Richardson P.C.

(57) ABSTRACT

A compostable packaging wrap comprising: a strip that is primarily formed of starch and that is flexible such that the strip can be rolled is disclosed. In addition, a compostable or recyclable packaging wrap that includes: a first film that is primarily formed of one or more compostable or recyclable materials; a second film that is primarily formed of one or more compostable or recyclable materials; a plurality of pads, each pad being are surrounded by the first film and the second film and being primarily formed of one or more compostable or recyclable materials is disclosed. The compostable or recyclable packaging wrap is flexible such that the packaging wrap can be rolled.

13 Claims, 8 Drawing Sheets

Related U.S. Application Data (60) Provisional application No. 62/702,859, filed on Jul. 24, 2018.

(51) Int. Cl.
    *B65D 65/46*     (2006.01)
    *B65D 65/22*     (2006.01)

(58) Field of Classification Search
    CPC ... B65D 2565/385; B65D 65/466; C08L 3/02; C08L 3/00; C08L 2666/02
    USPC .............. 206/524.3, 410; 428/906, 172, 34.7, 428/36.6; 229/87.02
    See application file for complete search history.

(56) References Cited

U.S. PATENT DOCUMENTS

| | | |
|---|---|---|
| 5,208,267 A | 5/1993 | Neumann et al. |
| 5,564,570 A | 10/1996 | Jaszai |
| 5,660,903 A | 8/1997 | Anderson |
| 5,665,439 A | 9/1997 | Andersen et al. |
| 5,688,578 A * | 11/1997 | Goodrich ............... B31C 5/00 428/184 |
| 5,733,403 A | 3/1998 | Morley |
| 5,830,548 A | 11/1998 | Andersen et al. |
| 5,897,017 A | 4/1999 | Lantz |
| 5,912,058 A | 6/1999 | Takahashi et al. |
| 6,050,412 A | 4/2000 | Clough |
| 6,257,764 B1 | 7/2001 | Lantz |
| 6,283,296 B1 | 9/2001 | Newman |
| 6,619,500 B1 | 9/2003 | Lantz |
| 6,938,968 B2 | 9/2005 | Tanimoto |
| 7,601,657 B2 | 10/2009 | Zhou et al. |
| 7,870,992 B2 | 1/2011 | Schille et al. |
| 8,182,457 B2 | 5/2012 | Olson et al. |
| 8,557,367 B2 | 10/2013 | Netravali |
| 8,617,684 B2 | 12/2013 | Nomura |
| 8,763,811 B2 | 7/2014 | Lantz |
| 9,550,618 B1 | 1/2017 | Jobe |
| 9,957,098 B2 | 5/2018 | Jobe |
| 10,046,901 B1 | 8/2018 | Jobe |
| 11,247,827 B2 | 2/2022 | Jobe |
| 2002/0164465 A1 | 11/2002 | Curro et al. |
| 2003/0082357 A1 | 5/2003 | Gokay |
| 2003/0129356 A1 | 7/2003 | Laskorski |
| 2004/0058119 A1 | 3/2004 | Wynne |
| 2005/0281978 A1 * | 12/2005 | Cabell ............... B32B 5/08 428/92 |
| 2007/0051782 A1 | 3/2007 | Lantz |
| 2007/0272574 A1 * | 11/2007 | Uitenbroek ........... B65D 65/10 206/410 |
| 2008/0147034 A1 * | 6/2008 | Wang ............... B32B 1/02 428/339 |
| 2008/0289302 A1 | 11/2008 | Vulpitta |
| 2009/0001086 A1 | 1/2009 | Roderick et al. |
| 2010/0314397 A1 | 12/2010 | Williams |
| 2011/0248038 A1 | 10/2011 | Mayer |
| 2011/0259895 A1 | 10/2011 | Parenteau et al. |
| 2011/0318522 A1 | 12/2011 | Mueller et al. |
| 2012/0070609 A1 | 3/2012 | Poppe |
| 2012/0097067 A1 | 4/2012 | Fascio |
| 2012/0279896 A1 | 11/2012 | Lantz |
| 2012/0312814 A1 | 12/2012 | Tolibas-Spurlock |
| 2014/0272163 A1 | 9/2014 | Tilton |
| 2014/0319018 A1 | 10/2014 | Collison |
| 2016/0052692 A1 | 2/2016 | Branham |
| 2016/0194135 A1 | 7/2016 | Baker |
| 2018/0086538 A1 | 3/2018 | Jobe |
| 2018/0194534 A1 | 7/2018 | Jobe et al. |
| 2018/0327171 A1 | 11/2018 | Waitermire |
| 2018/0339838 A1 | 11/2018 | Hall |
| 2020/0031556 A1 | 1/2020 | Jobe |

FOREIGN PATENT DOCUMENTS

| | | |
|---|---|---|
| EP | 2000422 | 5/2012 |
| JP | S51-027680 | 8/1976 |
| JP | 2006/062691 | 3/2006 |
| JP | 2009-292875 | 12/2009 |
| WO | WO 1993/06013 | 4/1993 |
| WO | WO 1997/37842 | 10/1997 |
| WO | WO 1999/32374 | 7/1999 |
| WO | WO 2006/117801 | 11/2006 |

OTHER PUBLICATIONS

International Search Report and Written Opinion in International Patent Application No. PCT/US2019/043053, dated Dec. 2, 2019, 15 pages.

Office Action in Japanese Appln. No. 2021-504274, dated Jun. 13, 2023, 8 pages (with English translation).

Office Action in Chinese Appln. No. 201980062112.0, dated Aug. 22, 2023, 9 pages (with English search report).

\* cited by examiner

COMPOSTABLE OR RECYCLABLE PACKAGING WRAP

CROSS-REFERENCE TO RELATED APPLICATIONS

This application is a continuation of U.S. application Ser. No. 16/519,730, filed Jul. 23, 2019, which claims the benefit of U.S. Provisional Application Ser. No. 62/702,859, filed on Jul. 24, 2018, the disclosure of which is incorporated by reference.

TECHNICAL FIELD

This invention relates to a compostable or recyclable packaging wrap used for shipping.

BACKGROUND

A conventional wrapping material is polyethylene. For example, a packaging material, e.g., a bubble wrap, can be used to surround and cushion an item to be packed in a shipping box and shipped. Alternatively, other packaging materials can be molded to form a particular shape to hold an item being shipped and can be placed in a shipping box.

Polyethylene is relatively inexpensive and easily formed into a variety of shapes, but is not compostable. Consequently, disposing of the material of the container can be a problem.

SUMMARY

A packaging wrap that provides protection to an item to be shipped and that is recyclable or compostable is disclosed.

In general, in one aspect, a compostable or recyclable packaging wrap includes: a strip that is primarily formed of starch, wherein the strip is flexible such that the strip can be rolled.

The foregoing and other implementations can each optionally include one or more of the following features, alone or in combination. The one or more compostable materials include at least one of a grain starch, a root starch, a vegetable starch, and combinations thereof. A depth of the strip is between ⅛ inches and 2.5 inches. In a state in which the strip is rolled, a radius of the rolled strip is between 1 inch and 20 inches. A density of the strip is within at least one of a first range that is 0.25-4.0 g/cm3, a second range that is 0.6-1.0 g/cm3, a third range that is 0.8-2.0 g/cm3, and a fourth range that is 1.0-3.5 g/cm3. The strip comprises: a plurality of sections, wherein a boundary between two adjacent sections of the plurality of sections is perforated. At least 85% of the strip includes a starch by weight of the packaging wrap.

In general, another aspect, a compostable or recyclable packaging wrap that includes: a first film that is primarily formed of one or more compostable or recyclable materials; a second film that is primarily formed of one or more compostable or recyclable materials; a plurality of pads, each pad being are surrounded by the first film and the second film and being primarily formed of one or more compostable or recyclable materials, wherein the packaging wrap is flexible such that the packaging wrap can be rolled.

The foregoing and other implementations can each optionally include one or more of the following features, alone or in combination. The one or more compostable or recyclable materials for the first film and the second film include at least one of polylactic acid (PLA), poly(beta-amino) esters (PBAE), polyhydroxyalkanoate (PHA), polycapralactones (PCL), polybutyrate adipate terephthalate (PBAT) polyvinylalcohol (PVA), ethylene vinyl alcohol (EVOH), and combinations thereof. The one or more compostable or recyclable materials for the first film and the second film includes at least one of LDPE, MDPE, HDPE, polyethylene terephthalate, and combinations thereof. The one or more compostable or recyclable materials for the plurality of pads include at least one of a grain starch, a root starch, a vegetable starch, and combinations thereof. A depth of the first film is between 1/16 inches and 1.25 inches. A depth of the second film is between 1/16 and 1.25 inches. A depth of each pad of the plurality of pads is between 1/16 inches and 2 inches. In a state in which the packaging wrap is rolled, a radius of the rolled packaging wrap is between 1 inch and 20 inches. A density of the plurality of pads is within at least one of a first range that is 0.25-4.0 g/cm³, a second range that is 0.6-1.0 g/cm³, a third range that is 0.8-2.0 g/cm³, and a fourth range that is 1.0-3.5 g/cm³. The packaging wrap further includes a plurality of sections, wherein a boundary between two adjacent sections of the plurality of sections is perforated. Each section of the plurality of sections include a respective pad of the plurality of pads. The first film and the second film is attached to the plurality of pads using an adhesive. At least 85% of each pad of the plurality of pads includes a starch by weight of the pad.

Potential advantages may include (and are not limited to) one or more of the following. The packaging wrap is compostable, so all of the components of the packaging wrap are easily disposable. In certain cases, the packaging wrap can be perforated or scored such that a user can easily detach a section of the packaging wrap. In certain cases, the packaging wrap includes pads that are surrounded by films to provide additional protection to an item being shipped. In these cases, the films surrounding the pads are also compostable or recyclable, and also easily disposed.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Initially, some terminology may be beneficial. "Compostable" indicates both that a product will decompose quickly, e.g., within 180 days, and that the product will decompose into material that can be used as fertilizer (e.g., per ASTM D6400 or EN 13432). "Recyclable" indicates that a product can be reused or treated in order to be made suitable for reuse.

Most conventional packaging wraps are not compostable, and some are not recyclable. However, packaging wraps formed primarily of materials such as a starch are compostable as well as providing protection to an item being wrapped. In some implementations, a compostable packaging wrap can be rolled to save the storage space or being moved easily.

Figure 1A:
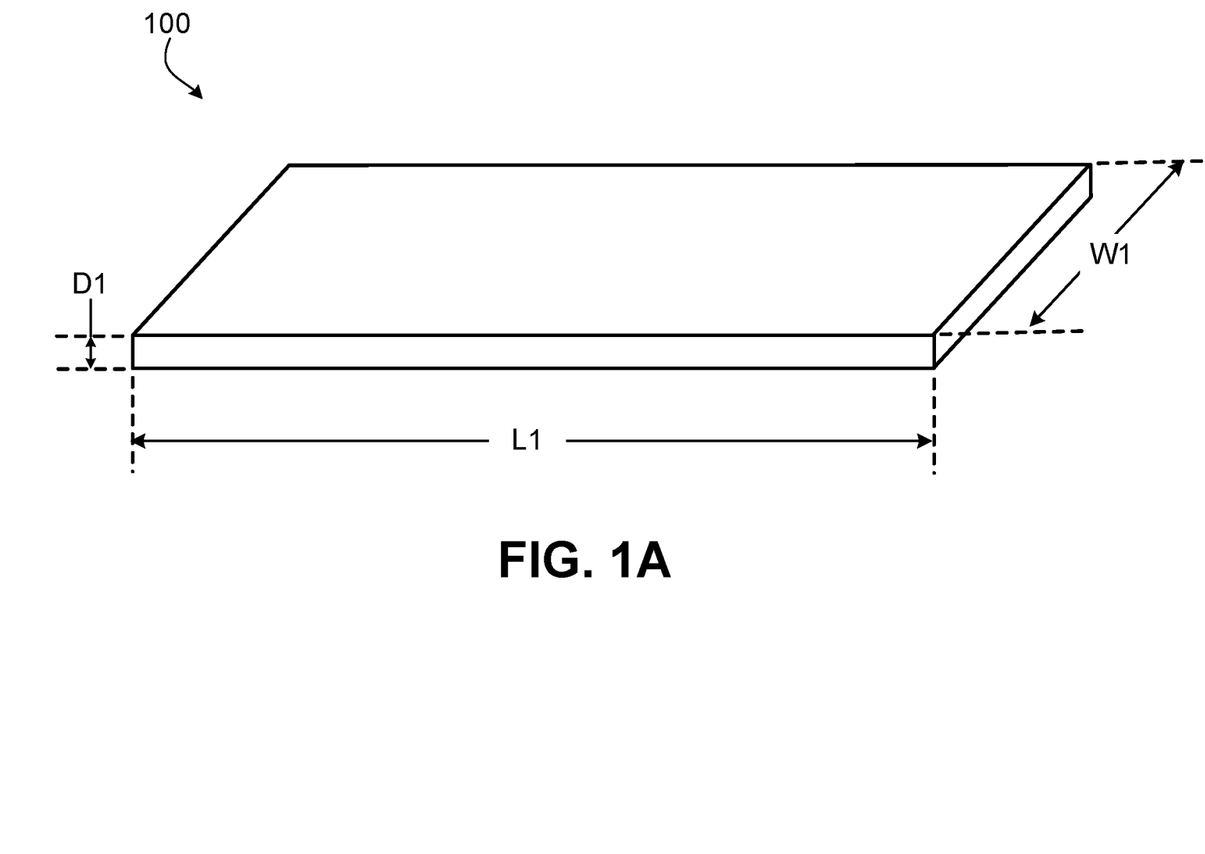
FIGS. 1A and 1B illustrate a first implementation of a compostable packaging wrap.
Figure 1B:
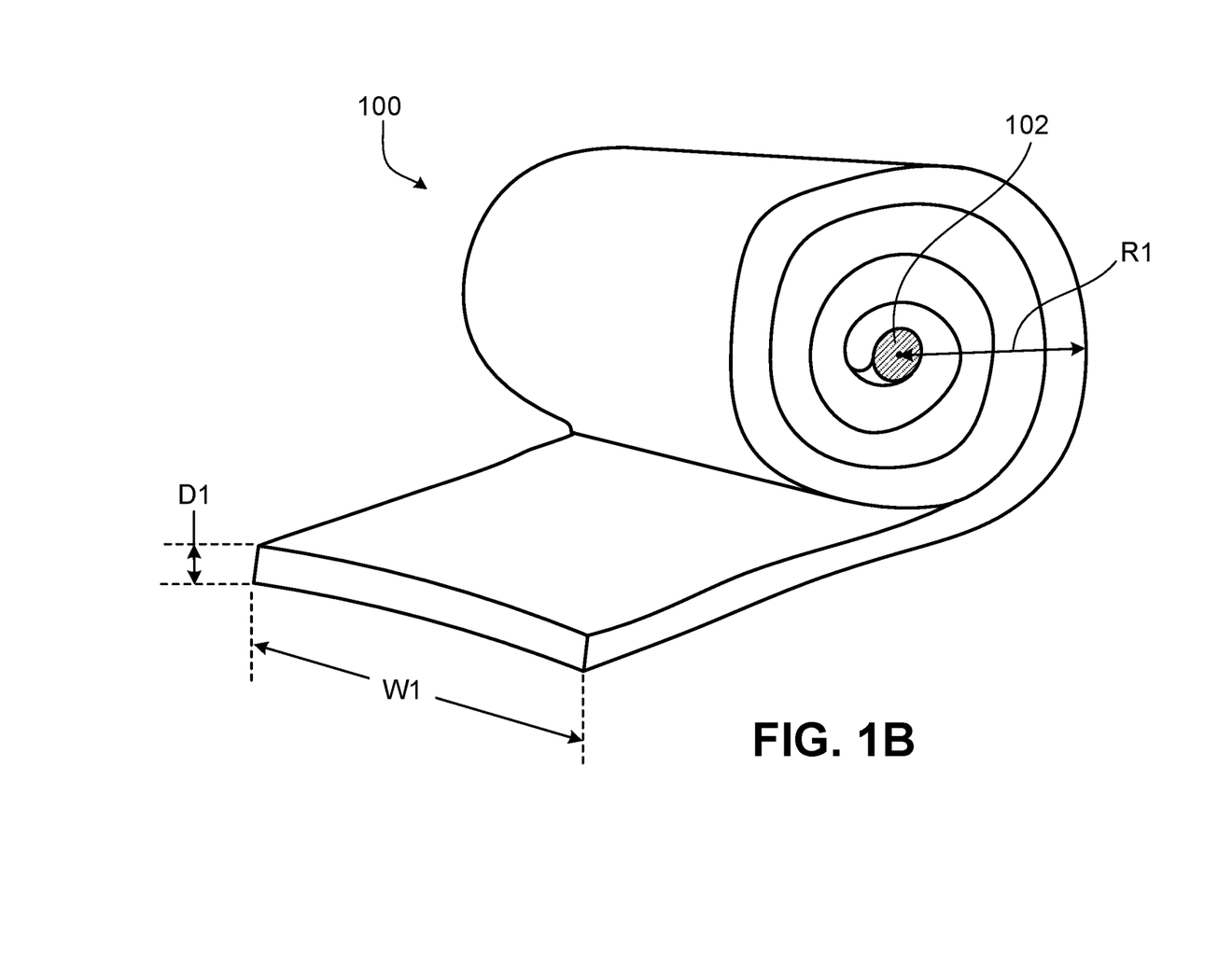

FIGS. 1A and 1B illustrate a first implementation of a packaging wrap 100 that is compostable or recyclable. FIG. 1A is a perspective view of the first implementation of the packaging wrap 100 in an unrolled form and FIG. 1B is a perspective view of the first implementation of the packaging wrap 100 in a rolled form.

Referring to FIG. 1A, in the unrolled stated, the packaging wrap 100 has a flat rectangular-shape, e.g., the wrap is a sheet. In particular, the wrap 100 provides an elongated strip. The strip can sharp edges, but in some implementations, edges of the compostable packaging wrap 100 can be rounded. In some implementations, the compostable packaging wrap 100 can have a particular shape to wrap a particular item. For example, the compostable packaging wrap 100 can have a bottle shape to wrap a wine bottle.

The compostable packaging wrap 100 can be primarily composed of compostable material. For example, packaging wrap 100 can be primarily composed of a starch, such as a grain starch (e.g., a corn starch, a wheat starch or sorghum, also known as milo), a root starch (e.g., a potato starch), or a vegetable starch. In some implementations, a combinations of different starches can be used. In some implementations, a starch can be mixed with one or more compostable or recyclable other materials, e.g., a plant fiber. The starch can provide at least 50%, e.g., at least 75%, e.g., at least 85%, e.g., at least or 95-99%, by weight of the packaging wrap 100. In some implementations, the packaging wrap 100 consists of starch. In some implementations, the packaging wrap 100 can be formed using an extrusion process.

In some implementations, other materials that do not interfere with the compostable nature of the packaging wrap 100, e.g., a softener to improve adhesion of the starch, or a preservative or anti-fungal agent, can be present, but only in small quantities. For example, at least 85%, e.g., at least 90%, e.g., 90-95% or 95-99%, by weight of the compostable packaging wrap 100 is made of starch. Polyvinyl alcohol can be present, e.g., 5-10% by weight.

In some implementations, the packaging wrap 100 is entirely compostable, i.e., consists of compostable materials. In some implementations, the packaging wrap 100 is composed of a combination of compostable and recyclable materials For example, in some implementations, additional materials, e.g., a water-retarding materials, are added to the compostable material, e.g., the starch, such that the combination is recyclable.

In some implementations, the material of the packaging wrap 100 can be a foam material, e.g., include small pores or voids spread substantially uniformly through the packaging wrap 100. For example, 10-80% of the volume of the packaging wrap 100 can be pores or voids, e.g., 25-75%, 25-50%, 10-25%, and 50-75%. The maximum size of the pores or voids can be about 1 mm. Although the packaging wrap 100 could be a foam material, it is generally incompressible.

The packaging wrap 100, in unrolled and unused form, can has a length that is greater than its width. For example, a length L1 of the compostable packaging wrap 100 can be between 10 inches and 500 feet, and a width W1 of the compostable packaging wrap 100 can be between 6 inches and 48 inches. In this example, the size of the compostable packaging wrap 100 represents the size of the entire unrolled compostable packaging wrap 100. However, the size of the compostable packaging wrap 100 is not limited to these example numbers. The compostable packaging wrap 100 can have any suitable size to wrap an item.

The compostable packaging wrap 100 also has a depth D1 (i.e., a thickness) that is less than the width W1. The depth D1 of the compostable packaging wrap 100 is such that the compostable packaging wrap 100 can be wrapped around a central post or tube, e.g., as shown in FIG. 1B. In particular, the depth D1 of the packaging wrap 100 is within a range such that, in conjunction with the material composition, the packaging wrap is sufficiently flexible so as to wrap around a central post having a particular diameter without breaking or permanent deformation. For example, the diameter of the center pole can be between ⅛ inches and 5 inches. If the depth of the compostable packaging wrap 100 is too large, the compostable packaging wrap 100 cannot be rolled. For example, where the compostable packaging wrap 100 is primarily formed of starch, the depth of the compostable packaging wrap 100 can be between ⅛ inches and 2.5 inches to be rolled. The maximum thickness of the compostable packaging wrap 100 can be different for various types of starch.

For some materials, the same material can have different densities depending on the manufacturing process, e.g., the degree of compression of the starch. In such cases, the density of the packaging wrap 100 can be selected, e.g., by selection of an appropriate processing parameters. For many materials, the greater the density (e.g., the higher the degree of compaction), the less flexible the material is. In such cases, the density of the packaging wrap 100 can be selected such that the compostable packaging wrap 100 can have enough flexibility to be rolled as described above. Where the compostable packaging wrap 100 is primarily formed of starch, the density of the compostable packaging wrap 100 can be about 0.25-4.0 g/cm$^3$, e.g., 0.6-1.0 g/cm$^3$, 0.8-2.0 g/cm$^3$, 1.0-3.5 g/cm$^3$.

In some implementations, the density of the packaging wrap 100 is substantially uniform, e.g., the material lacks pores or pores are distributed substantially uniformly through the sheet, and the degree of compaction of the material is similarly substantially uniform. However, in some implementations, the density of the packaging wrap 100 can vary along the length or width of the sheet, e.g., the degree of compaction of the material can vary.

Referring to FIG. 1B, the compostable packaging wrap 100 is in a rolled form. In some implementations, the packaging wrap 100 is rolled around a center pole 102. In some implementations, the center pole 102 can be primarily formed of compostable material. For example, the center pole 102 can be primarily formed of starch. The starch for the center pole 102 can be any type of starch described above with reference to FIG. 1A or any combination of two or more starches described above with reference to FIG. 1A. In some implementations, the compostable material for the center pole 102 can be the same as the compostable material of the compostable packaging wrap 100. In these implementations, the cost to manufacture the center pole 102 can be reduced because the center pole 102 and the compostable packaging wrap 100 are formed of the same compostable material. In some implementations, the compostable material for the center pole 102 can be different from the compostable material of the compostable packaging wrap 100. In these implementations, the compostable material for the center pole 102 can be harder than the compostable material for the compostable packaging wrap 100 such that the rolled compostable packaging wrap 100 can maintain its shape. In some implementations, the compostable packaging wrap 100 can be rolled without a center pole.

The compostable packaging wrap 100 can be wound around the center axis (e.g., the center pole) multiple times. For example, where the compostable packaging wrap 100 is rolled, a radius R1 of the rolled compostable packaging wrap 100 can be between 1 inch and 20 inches. The radius of the compostable packaging wrap 100 should not be limited to these particular numbers, but can be any suitable number.

Figure 2A:
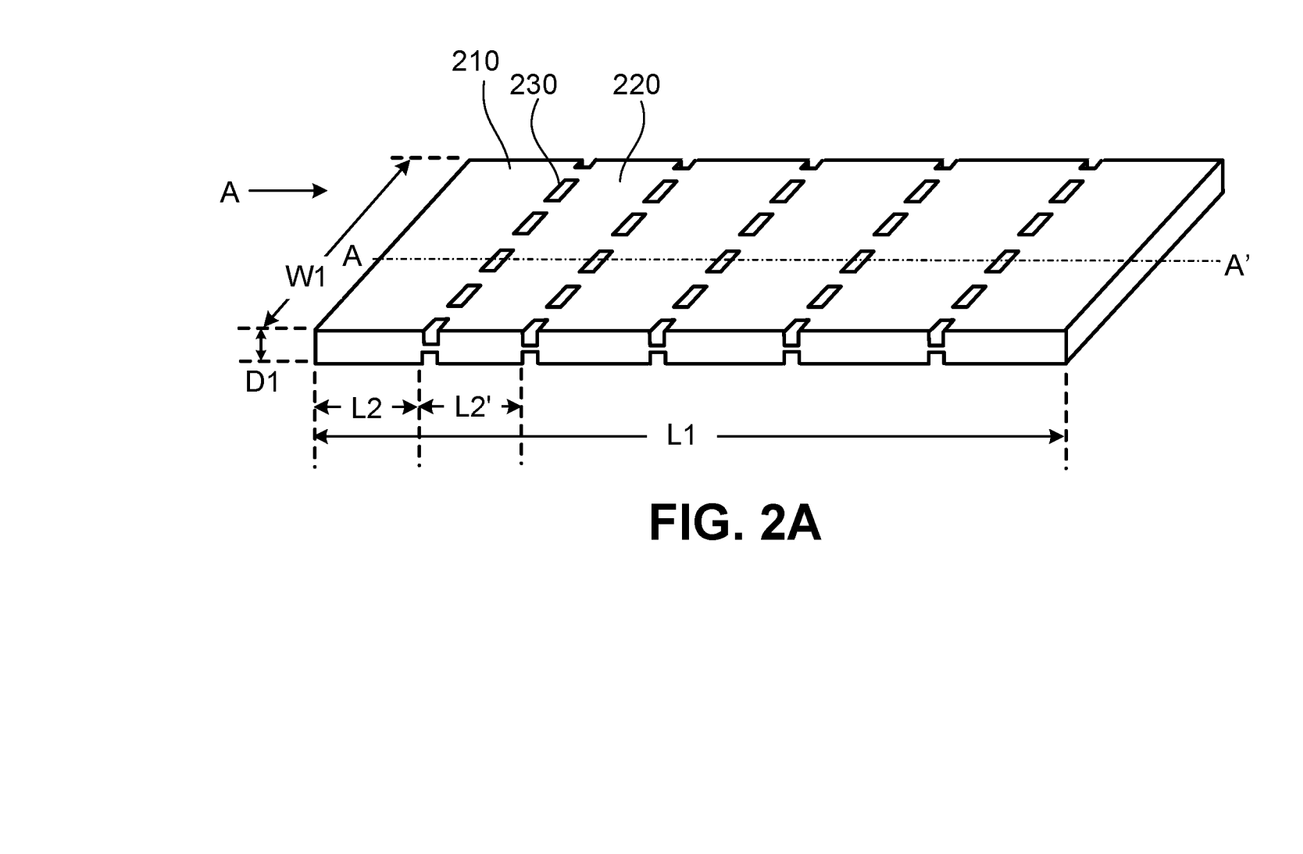
FIGS. 2A to 2D illustrate a second implementation of a compostable packaging wrap.
Figure 2B:
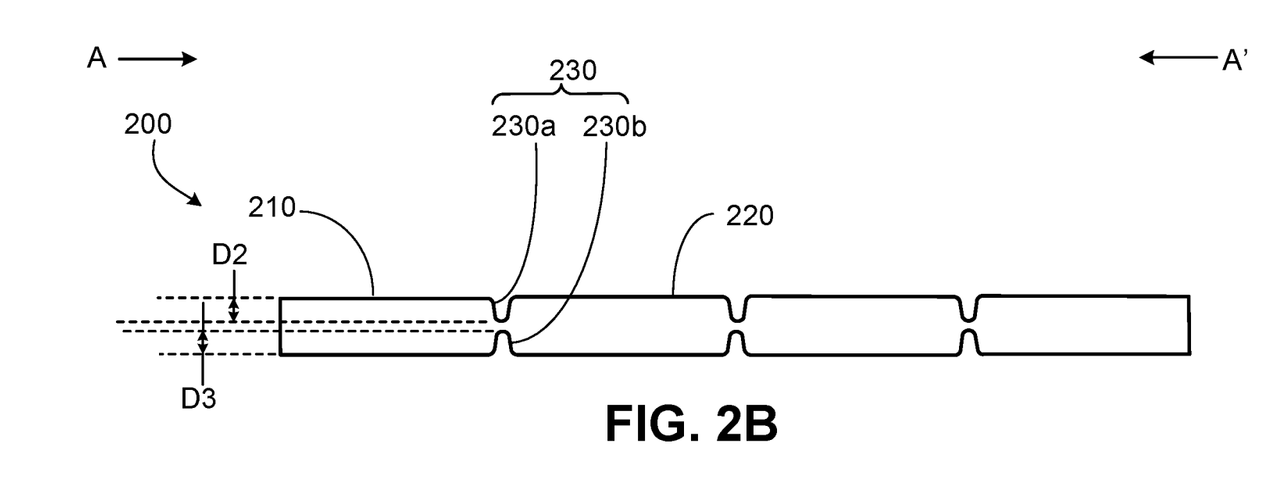
Figure 2C:
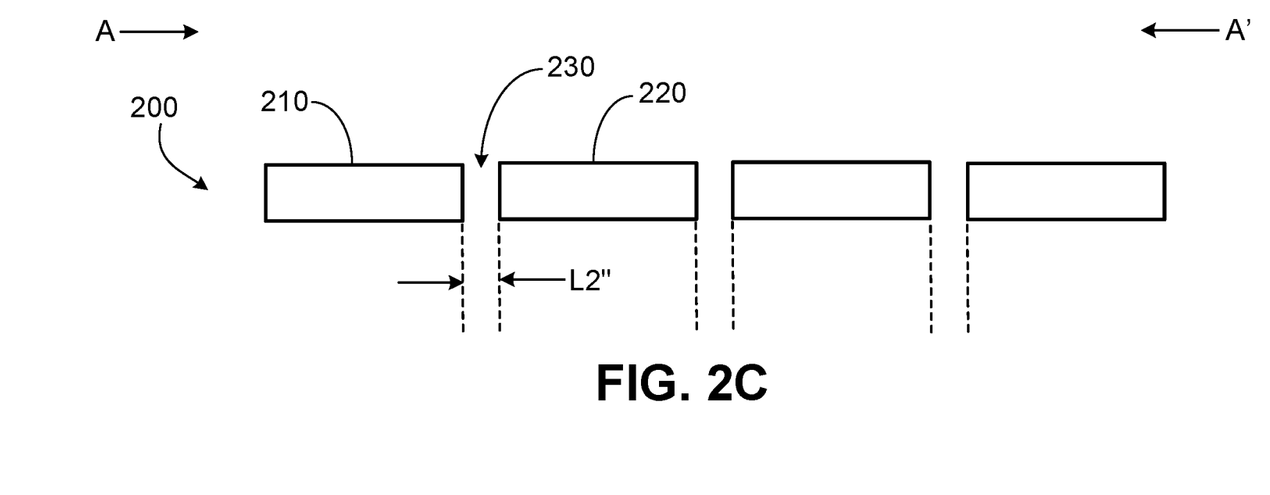
Figure 2D:
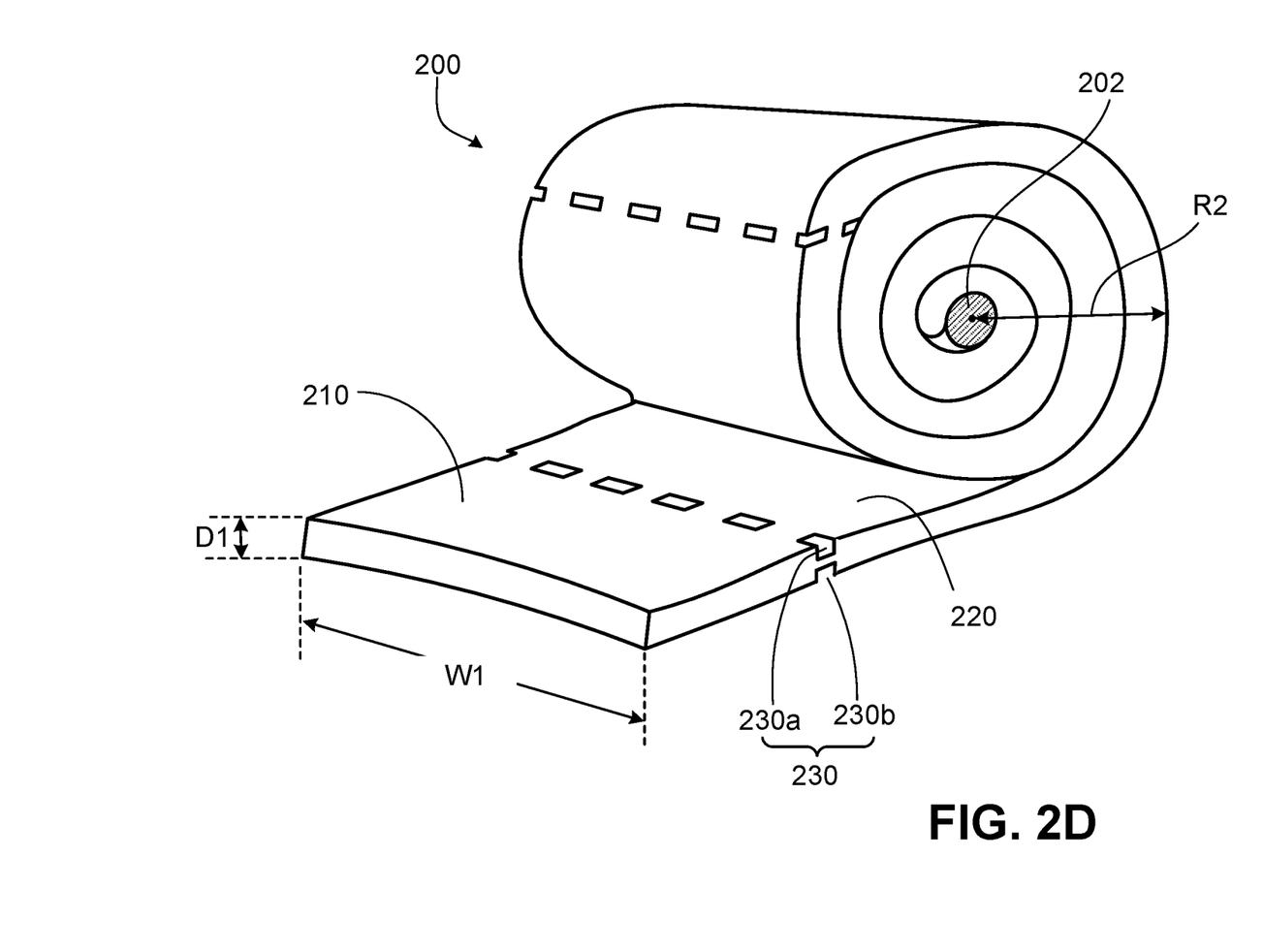

FIGS. 2A-2D illustrate a second implementation of a compostable packaging wrap 200. FIG. 2A is a perspective view of the second implementation of the compostable packaging wrap 200 in an unrolled form, FIG. 2B is a cross-sectional view of one example of the compostable packaging wrap 200 in an unrolled form, FIG. 2C is a cross-sectional view of another example of the compostable packaging wrap 200 in un unrolled form, and FIG. 2D is a perspective view of the second implementation of the compostable packaging wrap 200 in a rolled form. The compostable packaging wrap 200 can be the same as or similar to the compostable packaging wrap 100 described above with reference to FIGS. 1A and 1B except differences described below.

Referring to FIG. 2A, the compostable packaging wrap 200 includes multiple sections, e.g., a first section 210 and a second section 220, that are respectively divided by a scored or perforated portion, e.g., a scored or perforated portion 230, that permits easier manual detachment of one section from an adjacent section. The line of the score or perforation 230 can extend across the width of the strip of the packaging wrap 200.

In some implementations, the size of the each section of the multiple sections can be the same. For example, a length L2 of the first section 210 can be the same as a length L2' of the second section 220. In some implementations, different sections can have different sizes. For example, the length L2 of the first section 210 can be different from the length L2' of the second section 220. In this example, a user can use different sizes of wraps to wrap different sizes of items. That is, a user can use a smaller section to wrap a small item and a larger section to wrap a large item.

Referring to FIG. 2B, the scored or perforated portion 230 includes a first score 230a that is formed on a top surface of the compostable packaging wrap 200 and a second score 230b that is formed on a bottom surface of the compostable packaging wrap 200. The scores 230a and 230b can include multiple grooves formed on surfaces of the compostable packaging wrap 200. For example, the grooves for the first score 230a can have a depth D2 and the grooves for the second score 230b can have a depth D3. The depths D2 and D3 can be between ⅛ inches and 2.5 inches. In some implementations, the depth D2 can be the same as the depth D3. In some implementations, the depth D2 can be different from the depth D3.

In some implementations, where the compostable packaging wrap 200 is primarily formed of a starch, the depths D2 and D3 should be determined such that a section is not easily detached from the compostable packaging wrap 200 before a user detaches the section from the compostable packaging wrap 200. Moreover, when the compostable packaging wrap 200 is rolled, a section can be detached because of the tension between two sections, e.g., the first section 210 and the second section 220. Thus, the depths D2 and D3 should be shallow enough not to be detached by the tension. In these implementations, the depths D2 and D3 can be between ¹⁄₆₄ inches and 1.2 inches.

In some implementations, the scored or perforated portion 230 can include grooves that are formed only one surface of the compostable packaging wrap 200. For example, the scored or perforated portion 230 can include only the first score 230a that is formed on the top surface of the compostable packaging wrap 200. Alternatively, the scored or perforated portion 230 can include only the second score 230b that is formed on the bottom surface of the compostable packaging wrap 200. In these implementations, the depth of the grooves can be larger than the depth of the grooves where the scored or perforated portion 230 includes both the first score 230a and the second score 230b.

Referring to FIG. 2C, in some implementations, the scored or perforated portion 230 can have perforations that extend entirely through the sheet of the packaging wrap 200. A perforation can have a length L2". For example, the length L2" can be between 2 inches and 20 inches.

Referring to FIG. 2D, the compostable packaging wrap 200 is in a rolled form. The rolled compostable packaging wrap 200 can have a radius R2. In some implementations, where the compostable packaging wrap 200 is primarily made of a starch, the radius R2 of the compostable packaging wrap 200 can be determined based on the density of the starch material. In some implementations, the radius R2 of the compostable packaging wrap 200 can be the same as the radius R1 of the compostable packaging wrap 100 described with reference to FIG. 1B. In other implementations, to prevent a section from being detached from the compostable packaging wrap 200 due to the tension between two adjacent sections, the radius R2 can be smaller than the radius R1. For example, the radius R2 can be between 1 inch and 20 inches. The radius of the compostable packaging wrap 200 should not be limited to this particular number, but can be any suitable number.

Figure 3A:
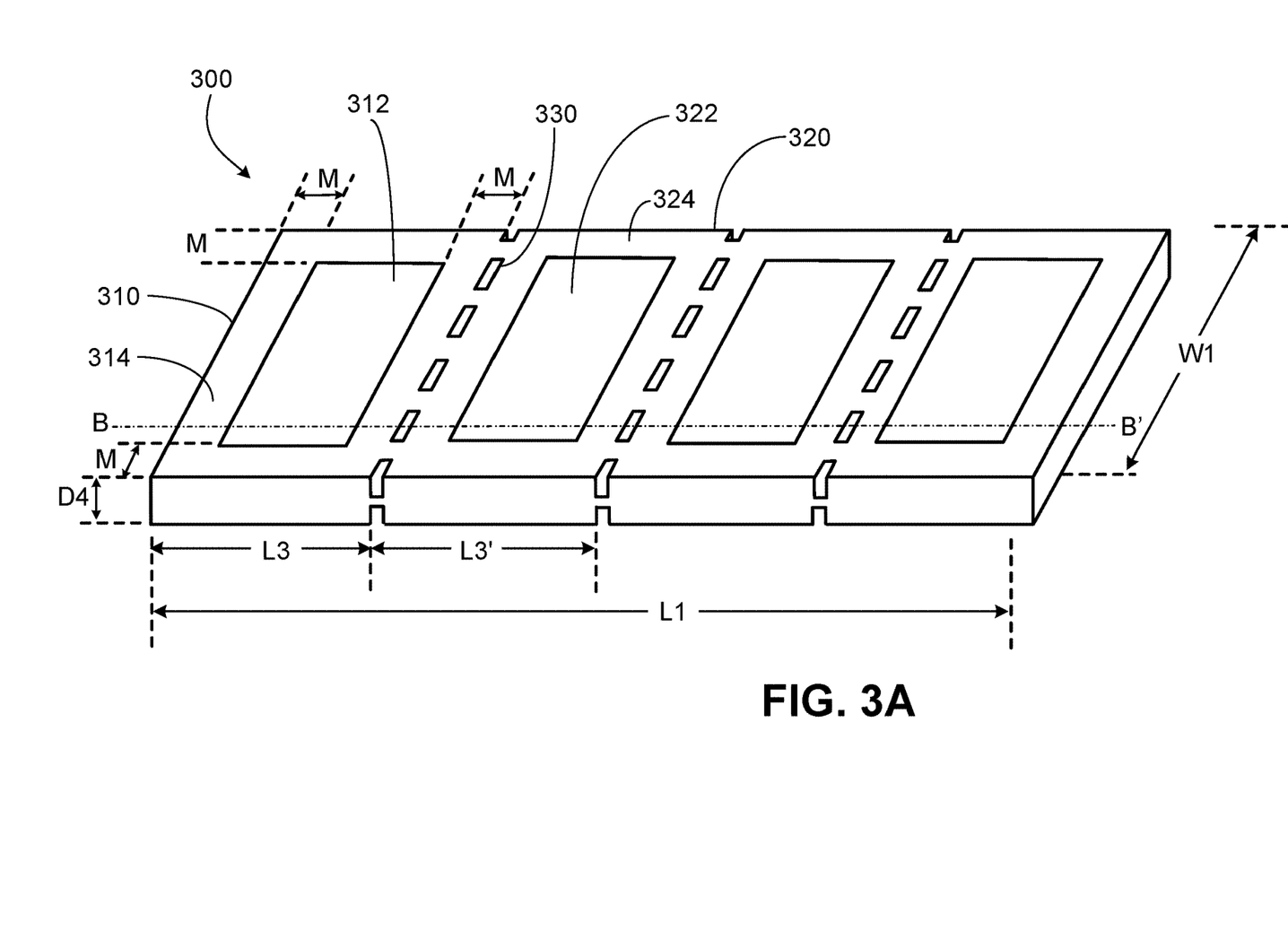
FIGS. 3A to 3C illustrate a third implementation of a compostable or recyclable packaging wrap.
Figure 3B:
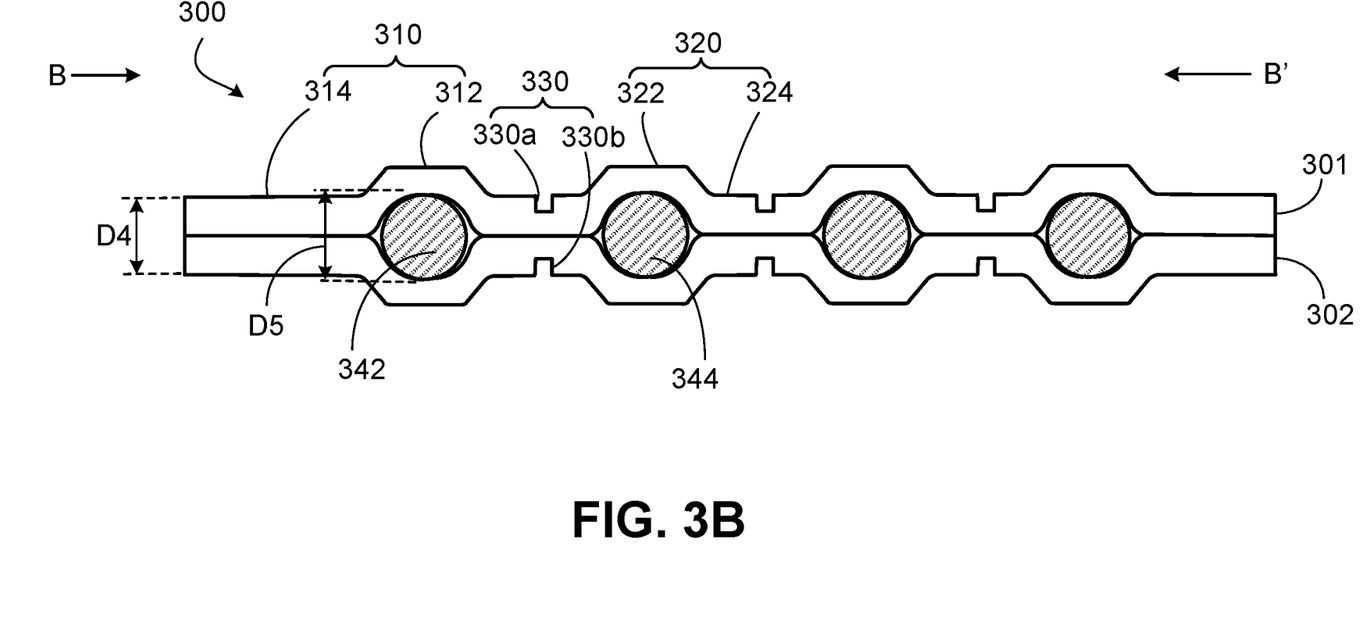
Figure 3C:
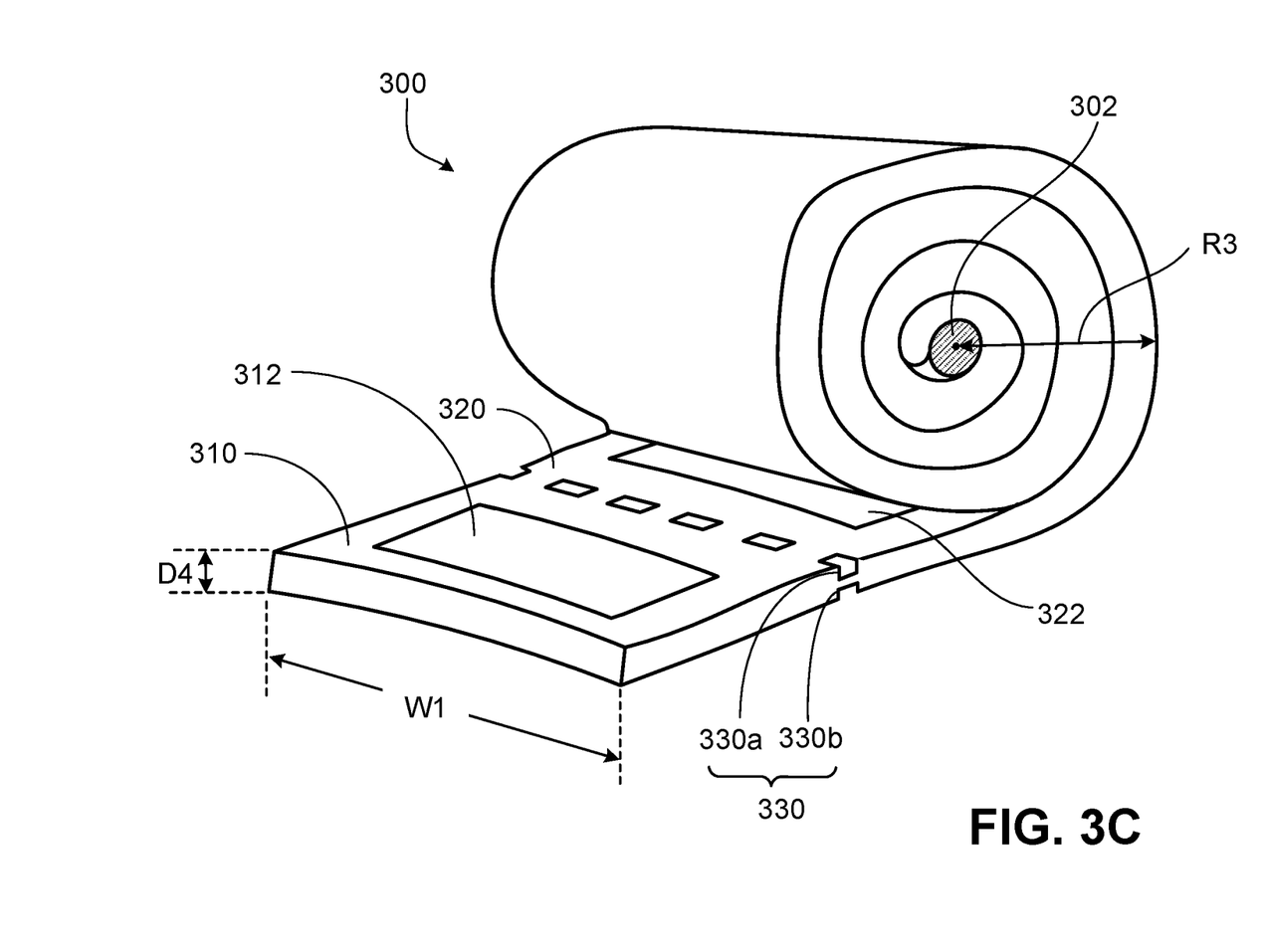

FIGS. 3A to 3C illustrate a first implementation of a compostable or recyclable packaging wrap 300. FIG. 3A is a perspective view of the compostable or recyclable packaging wrap 300 in an unrolled form, FIG. 3B is a cross-sectional view of the compostable or recyclable packaging wrap 300 in an unrolled form, and FIG. 3C is a perspective view of the compostable or recyclable packaging wrap 300 in a rolled form. The compostable or recyclable packaging wrap 300 can be the same as or similar to the compostable packaging wrap 200 described above with reference to FIGS. 2A to 2D except differences described below.

Referring to FIG. 3A, the compostable or recyclable packaging wrap 300 includes multiple sections, e.g., a first section 310 and a second section 320, that are respectively divided by a scored or perforated portion, e.g., a scored or perforated portion 330. In some implementations, the size of the each section of the multiple sections can be the same. For example, a length L3 of the first section 310 can be the same as a length L3' of the second section 320. In some implementations, the size of each section of the multiple sections can be different. For example, the length L3 of the first section 310 can be different from the length L3' of the second section 320. In this example, a user can use different sizes of wraps to wrap different sizes of items. That is, a user can use a smaller section to wrap a small item and a larger section to wrap a large item.

In some implementations, each section of the compostable or recyclable packaging wrap 300 includes a pad portion in a central area of the section and a boundary portion that surrounds the pad portion. For example, the first section 310 includes a pad portion 312 and a boundary portion 314 that surrounds the pad portion 312 and the second section 320 includes a pad portion 322 and a boundary portion 324 that surrounds the pad portion 322. The boundary portion 324 can have a margin M between the pad portion 322 and the edge of the first section 310. For example, the margin M can be between ½ inches and 5 inches. The margin is not limited to these numbers, but ca be any suitable number.

Referring to FIG. 3B, the compostable or recyclable packaging wrap 300 includes multiple films, e.g., a first film 301 and a second film 302, and compostable or recyclable pads, e.g., a first pad 342 and a second pad 344, sandwiched between the films. For example, in the pad portion 312 of the first section 310, the top halves of the pads 342, 344 contacts the first film 301 and the bottom halves of the pads 342, 344 contact the second film 302. In the boundary portion 314 of the first section 310, two films 301 and 302 are coupled together, e.g., by adhesive. In some implementations, the films 301 and 302 can be secured to the pads 342,344 using an adhesive. In some implementations, the pads 342, 344 fit in the pockets formed by the films 301 and 302. In some implementations, the pads 342, 344 are substantially constrained in the pockets, e.g., air is evacuated from the pockets. In some implementations, the pads 342, 344 sit loose, e.g., are slidable, within the pockets formed by the files 301, 302.

In some implementations, a depth of each film can be a half of a depth D4. For example, the depth of the film can be ¹/₁₆ inches and 1.25 inches. In some implementations, a depth of the pad, e.g., the first pad 342, can be between ¹/₁₆ inches and 2 inches. However the depth D5 is not limited to these numbers. The depth D5 can be any suitable number.

In some implementations, the scored or perforated portion 330 includes a first score 330a that is formed on a surface of the first film 301 and a second score 330b that is formed on a surface of the second film 302. The scores 330a and 330b can include multiple grooves formed on the surfaces of the films 301 and 302. The two films 301 and 302 adjacent to the scored or perforated portion 330 are coupled together without any pad between the two films 301 and 302. Alternatively, in some implementations, the scored or perforated portion 330 can have perforations that extend entirely through the sheet of the packaging wrap 300.

In some implementations, the pads, e.g., the first pad 342 and the second pad 344, can be primarily formed of compostable material. For example, the compostable material for the pads 342 and 344 is primarily a starch, e.g., a grain starch (e.g., a corn starch, a wheat starch or sorghum, also known as milo), a root starch (e.g., a potato starch), or a vegetable starch. In some implementations, a combinations of different starches can be used for the pads 342 and 344. In some implementations, at least 85%, e.g., 90-95%, of the pad portion 312 can include a starch by weight of the pad portion 312.

In some implementations, the films, e.g., the first film 301 and the second film 302, can be compostable, e.g., a bioplastic that meets ASTM D6400 standards. Example materials for a compostable film include polymers based on one or more of polylactic acid (PLA), poly(beta-amino) esters (PBAE), polyhydroxyalkanoate (PHA), polycapralactones (PCL), polybutyrate adipate terephthalate (PBAT) polyvinylalcohol (PVA), or ethylene vinyl alcohol (EVOH). In addition, any combinations of these materials can be used for the films 301 and 302. For example, a combination of PBAT and PE can be used for the films 301 and 302. As another example, a combination of PE and PLA can be used for the films 301 and 302. In some implementations, the polymer can be mixed with an organic product, e.g., a starch.

In some implementations, the films, e.g., the first film 301 and the second film 302, can be recyclable. A suitable material for the recyclable film is polyethylene. For example, the films 301 and 302 can include LDPE, MDPE, HDPE, or polyethylene terephthalate. An advantage of polyethylene is ease of fabrication and good water resistance.

In some implementations, the films, e.g., the first film 301 and the second film 302, can be paper sheets. If the paper is thin enough or is perforated, the paper is compostable. Optionally, the paper can be lined with a water-repellent coating. Either the inner surface of the film, or the outer surface, or both can be lined with the water-repellent coating. The water-repellent coating can be a compostable material, e.g., wax. In this example, the film with paper and coating is compostable. Alternatively, the water-repellent coating can be a recyclable material. In this example, the layer with paper and coating is recyclable.

Referring to FIG. 3C, the compostable or recyclable packaging wrap 300 is in a rolled form. The rolled compostable or recyclable packaging wrap 300 can have a radius R3. In some implementations, where the compostable or recyclable packaging wrap 300 includes the pads, e.g., the pads 342 and 344, between the two films, e.g., the films 301 and 302, the radius R3 of the compostable or recyclable packaging wrap 300 can be determined based on the density of the materials for the films or the pads and/or the depth D5 of the pads and the depth D4 of the films. For example, the radius R3 of the compostable or recyclable packaging wrap 300 can be between 1 inch and 20 inches. The radius of the compostable packaging wrap 300 should not be limited to these particular numbers, but can be any suitable number.

A variety of combinations of the features discussed above are possible. The drawings show only a limited number of possible combinations, and it should be assumed that the various features described can be used together in any consistent combination. A number of embodiments have been described. Nevertheless, it will be understood that various modifications may be made without departing from the spirit and scope of the invention. Accordingly, other embodiments are within the scope of the following claims.

What is claimed is:

1. A compostable packaging wrap consisting of:
   a strip provided by a single layer of at least ⅛ inch thickness that consists of compostable material that includes at least 50% starch and a sufficient amount of compostable polymer softener such that the strip is sufficiently flexible to be rolled into a 1 inch radius, wherein solid components of the layer consist of organic compostable material.

2. The packaging wrap of claim 1, wherein the starch includes at least one of a grain starch, a root starch, a vegetable starch, and combinations thereof.

3. The packaging wrap of claim 1, wherein a depth of the strip is between ⅛ inches and 2.5 inches.

4. The packaging wrap of claim 1, wherein a density of the strip is within at least one of a first range that is 0.25-4.0 g/cm3.

5. The packaging wrap of claim 1, wherein at least 85% of the strip includes a starch by weight of the packaging wrap.

6. The packaging wrap of claim 1, wherein the compostable material includes a water-retardant material.

7. The packaging wrap of claim 6, wherein the compostable material consists of the starch, the softener and the water-retardant material.

8. The packaging wrap of claim 1, wherein the strip has a length greater than its width.

9. The packaging wrap of claim 8, wherein the width of the strip is between 6 inches and 48 inches.

10. The packaging wrap of claim 9, wherein the length of the strip is between 10 inches and 500 feet.

11. The packaging wrap of claim 1, wherein the strip is sufficiently flexible that the strip can be rolled into ⅛ inch diameter.

12. The packaging wrap of claim 1, wherein the strip is porous.

13. The packaging wrap of claim 12, wherein 10-25 vol % of the strip is pores or voids.

* * * * *